(12) United States Patent
Rus et al.

(10) Patent No.: US 7,726,823 B2
(45) Date of Patent: Jun. 1, 2010

(54) INTERNAL CABLE MANAGEMENT SYSTEM FOR MOVABLE SUPPORT ARM

(75) Inventors: Steven H. Rus, Chardon, OH (US);
Yury Keselman, Beachwood, OH (US);
Bernard J. Moss, Perry, OH (US)

(73) Assignee: American Sterilizer Company, Mentor, OH (US)

( * ) Notice: Subject to any disclaimer, the term of this patent is extended or adjusted under 35 U.S.C. 154(b) by 260 days.

(21) Appl. No.: 12/045,760

(22) Filed: Mar. 11, 2008

(65) Prior Publication Data

US 2008/0225534 A1   Sep. 18, 2008

Related U.S. Application Data

(60) Provisional application No. 60/894,276, filed on Mar. 12, 2007.

(51) Int. Cl.
*F21V 33/00* (2006.01)

(52) U.S. Cl. .................. 362/33; 362/404; 362/804; 362/419; 362/572; 362/147; 600/249

(58) Field of Classification Search ............. 362/404, 362/405, 407, 387, 804, 391, 419, 572, 33, 362/147; 396/4; 600/249; 174/68.1, 68.3, 174/481
See application file for complete search history.

(56) References Cited

U.S. PATENT DOCUMENTS

| 2,809,281 | A | | 10/1957 | Greppin ..................... 362/8 |
| 4,316,238 | A | * | 2/1982 | Booty et al. ................ 362/147 |
| 6,633,328 | B1 | * | 10/2003 | Byrd et al. ................. 348/143 |
| 6,866,410 | B2 | | 3/2005 | Jesurun et al. .............. 362/572 |
| 6,899,442 | B2 | * | 5/2005 | Howell et al. ............... 362/147 |
| 7,254,850 | B2 | | 8/2007 | Newkirk et al. .............. 5/600 |
| 2003/0210559 | A1 | * | 11/2003 | Jesurun et al. .............. 362/572 |
| 2005/0166542 | A1 | | 8/2005 | Stidman ................... 52/782.1 |

* cited by examiner

*Primary Examiner*—Laura Tso
(74) *Attorney, Agent, or Firm*—Kusner & Jaffe; Michael A. Centanni (57) ABSTRACT

A cable management system for managing at least one cable extending through a support arm and through a hub, comprised of a spool disposed in a hub. The spool has an opening extending through a wall of the spool. A cable carrier is disposed within the support arm. The cable carrier is dimensioned to contain at least one cable extending through the support arm, a first end fixed relative to the support arm and a second end extending towards the hub. The cable carrier is disposed in the support arm such that the cable carrier replicates upon itself to define a first run and a second run. The second end of the cable carrier is movable relative to the hub when the support arm rotates about the hub, wherein the first run shortens and the second run lengthens when the support arm rotates in a direction about the hub.

25 Claims, 11 Drawing Sheets

INTERNAL CABLE MANAGEMENT SYSTEM FOR MOVABLE SUPPORT ARM

This application claims the benefit of U.S. Provisional Application No. 60/894,276 filing date Mar. 12, 2007.

FIELD OF THE INVENTION

The present invention relates generally to a ceiling-mounted, surgical light/monitor system for use in a surgical theater, and more particularly, to a cable management system for managing cables extending through movable support arms that support a surgical light, video camera or video monitor. The present invention is particularly applicable to an internal cable management system for managing cables extending through a monitor support arm of a ceiling-mounted, surgical light/monitor system and will be described with particular reference thereto. It being appreciated, however, that the present invention finds advantageous application in other types of cable or wiring management applications.

BACKGROUND OF THE INVENTION

Video monitors are used in surgical and operating rooms to provide images and information to medical personnel regarding a patient. For example, images produced by an endoscopic camera or information regarding a patient's vital signs are typically displayed on video monitors for continuous viewing by surgeons and support staff.

It is known to suspend video monitors from ceiling-mounted supports as part of a ceiling-mounted, surgical light/monitor system. The video monitors are typically suspended by support arms that are movable about a vertical spindle supported from the ceiling. The support arms are typically tubular members. Monitor connection cables and lines extend from the monitor to a remotely located control unit that provides the information or images to be displayed on the monitor. In this respect, the monitor cables typically extend through the support arm and typically through the ceiling mounting structure to the remote location of the control unit. Because the support arms that support the video monitors are movable about the spindle, it is necessary that the monitor connection lines and cables that extend through the support arm and through the ceiling support structure be arranged in a manner to accommodate such movement.

In some ceiling mounted systems, it is known to allow the monitor connection cables to wrap and unwrap about a central spindle as the support arm and monitor are moved about the central spindle. To ensure smooth and flawless operation, i.e., rotation of a support arm about a shaft or spindle, it is necessary that some arrangement be made to facilitate unwinding of the cable from the spindle as the support arm and monitor move in a particular direction. Heretofore, it has been known to form the connection cable or line to have a coiled portion that would be positioned within an opening defined by the tubular support arm. The coiled portion of the monitor cable would act as a spring and would extend when the monitor cable is being wrapped around the spindle and would contract when the support arm moves in a direction to unwrap the cable from the spindle. In this respect, the coiled cord within the support arm would act as a tensioning spring to pull the cable off of the spindle as the support arm moves in a particular direction.

One problem with these types of systems is the complexity and cost of forming the coiled portion of the monitor connection cable. In this respect, coiling a portion of the monitor connection cable requires extra cable length to form the coiled portion. Further, stiffer conductor alloys are required to produce the "spring-like" effect in the monitor connection cables. As a result, such cables are more expensive to manufacture as compared to conventional connection cables.

Another problem is that it is difficult to maintain a consistent spring constant in the coiled portion of the monitor connection cables.

Still another problem with coiling a portion of the connection cable is that the coiled section of such cables poses a potential electrical noise interference problem due to the formation of self-induced electromotive forces created by a time-varying electrical current flow through the coiled portion of the cable.

The present invention overcomes these and other problems and provides a cable management system for managing cables extending through a support arm that is movable about a central spindle in a surgical light/monitor system.

SUMMARY OF THE INVENTION

In accordance with one embodiment of the present invention, there is provided a surgical light/monitor system for use in a surgical theater. The light/monitor system has a central hub and at least one tubular support arm rotatable about the central hub and a cable management system for managing at least one cable extending through the support arm and through the hub. The cable management system is comprised of a spool disposed in a hub. The spool has an opening extending through a wall of the spool. A cable carrier is disposed within the support arm. The cable carrier is dimensioned to contain at least one cable extending through the support arm. The cable carrier has a first end fixed relative to the support arm and a second end extending towards the hub. The cable carrier is disposed in the support arm such that the cable carrier replicates upon itself to define a first run and a second run. The second end of the cable carrier is movable relative to the hub when the support arm rotates about the hub, wherein the first run shortens and the second run lengthens when the support arm rotates in a direction about the hub.

In accordance with another aspect of the present invention, there is provided a cable management system for managing at least one cable extending through a support arm and through a hub. The support arm is rotatable about the hub. The cable management system is comprised of a spool disposed in a hub. The spool has an opening extending through a wall of the spool. A cable carrier is disposed within the support arm. The cable carrier is dimensioned to contain at least one cable extending through the support arm. The cable carrier has a first end fixed relative to the support arm and a second end extending towards the hub. The cable carrier is disposed in the support arm such that the cable carrier replicates upon itself to define a first run and a second run. The second end of the cable carrier is movable relative to the hub when the support arm rotates about the hub, wherein the first run shortens and the second run lengthens when the support arm rotates in a direction about the hub.

In accordance with yet another aspect of the present invention, there is provided a surgical light/monitor system for use in a surgical theater. The light/monitor system has a hub and at least one tubular support arm rotatable about the hub and a cable management system for managing at least one cable extending through the support arm and through the hub. The cable management system is comprised of a spool disposed in a hub. The spool has an opening extending through a wall of the spool. An expandable element is disposed within the support arm. The expandable element is dimensioned to connect at discrete points to at least one cable extending through the support arm. The expandable element has a first end fixed relative to the support arm and a second end extending towards the hub. The expandable element has a contracted state and an expanded state wherein the contracted state is shorter than the expanded state. The second end of the expandable element is movable relative to the hub when the support arm rotates about the hub, wherein the expandable element extends from the contracted state to the expanded state when the support arm rotates in a direction about the hub.

In accordance with another aspect of the present invention there is provided a cable management system for managing a cable in a support arm. The support arm is rotatable about a hub. The cable management system is comprised of a spool disposed in a hub. The spool has an opening extending through a wall of the spool. An expandable element is disposed within the support arm. The expandable element is dimensioned to connect at discrete points to at least one cable extending through the support arm. The expandable element has a first end fixed relative to the support arm and a second end extending towards the hub. The expandable element has a contracted state and an expanded state wherein the contracted state is shorter than the expanded state. The second end of the expandable element is movable relative to the hub when the support arm rotates about the hub, wherein the expandable element extends from the contracted state to the expanded state when the support arm rotates in a direction about the hub.

An advantage of the present invention is an internal cable management system for use in a support arm that is rotatable about a central spindle of a ceiling-mounted system for use in a surgical theater.

Another advantage of the present invention is an internal cable management system as described above that provides a constant, retracting force on a connection cable to retract the same from a central spindle during movement of a support arm.

Another advantage of the present invention is an internal cable management system as described above that provides a predetermined, consistent cable path.

Another advantage of the present invention is an internal cable management system as described above that minimizes self-induced electromotive forces within an electrical cable in a support arm.

Another advantage of the present invention is an internal cable management system as described above that minimizes cable length and the number of loops required for retractability, thereby resulting in an improved signal transfer.

Another advantage of the present invention is an internal cable management system as described above that maximizes the cross-sectional space for cables and wires extending through a support arm.

A still further advantage of the present invention is an internal cable management system as described above providing multiple access points on a support arm, thereby providing easy accessibility to a cable tensioning device.

Still another advantage of the present invention is an internal cable management system as described above that allows use of the industry standard types of wires and cables within a support arm.

These and other advantages will become apparent from the following description of a preferred embodiment taken together with the accompanying drawings and the appended claims.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof, and wherein.

DETAILED DESCRIPTION OF PREFERRED EMBODIMENT

Figure 1:
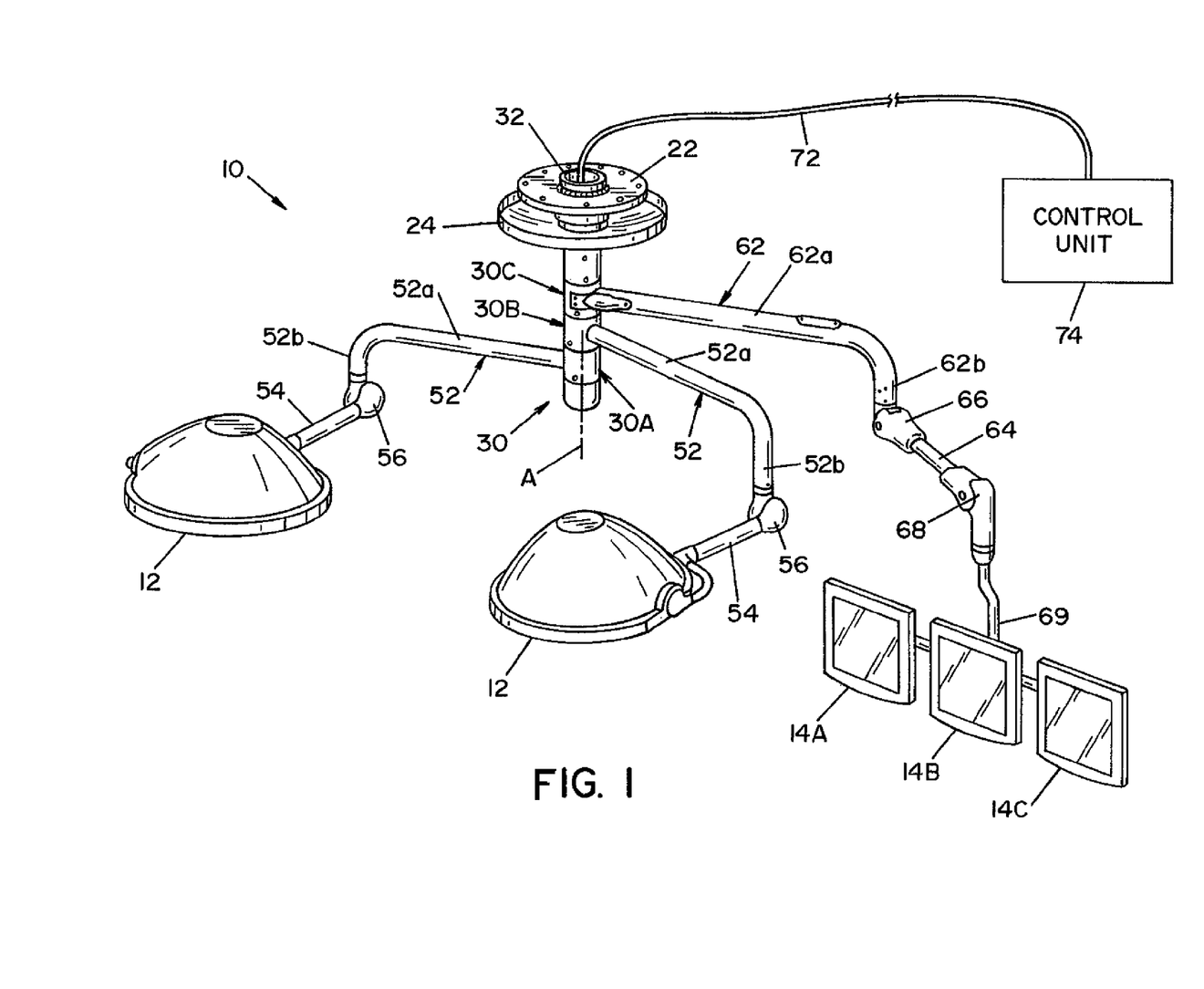
FIG. 1 is a perspective view of a ceiling-mounted, surgical light/monitor system for use in a surgical or operating room.

Referring now to the drawings wherein the showings are for the purpose of illustrating a preferred embodiment of the invention only, and not for the purpose of limiting same, FIG. 1 shows a surgical lighting/monitor system 10 for use in a surgical theater. In the embodiment shown, surgical lighting/monitor system 10 includes two surgical lights 12 and three video monitors, designated 14A, 14B, 14C.

System 10 is comprised of a hub assembly 30 that is mounted to a ceiling structure (not shown) by means of a mounting plate 22. Conventional fasteners (not shown) secure mounting plate 22 to the ceiling structure. A domed-shaped cover plate 24 is provided to cover and enclose mounting plate 22 and the fastening means.

Figure 2:
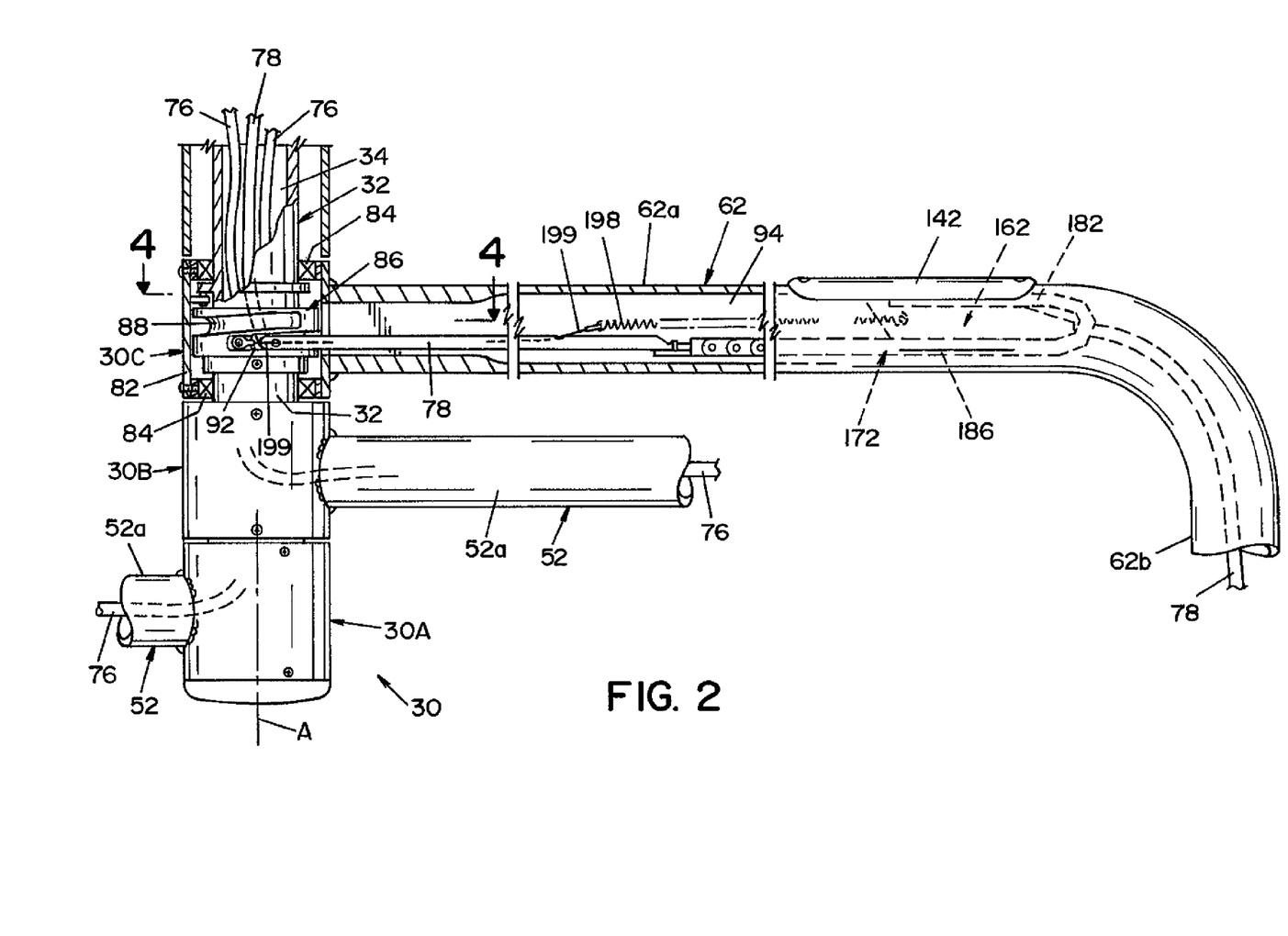
FIG. 2 is an enlarged, partially sectioned, elevational view showing a hub assembly from the surgical light/monitor system of FIG. 1, showing a monitor support arm and lamp support arms extending from the hub assembly.

Hub assembly 30 is comprised of a central spindle 32 supported by mounting plate 22 and a plurality of hub sections 30A, 30B, 30C mounted to spindle 32. Spindle 32 extends vertically downward from mounting plate 22, as best seen in FIG. 2. Each hub section 30A, 30B, 30C is designed to be rotatable about spindle 32.

Hub sections 30A and 30B each include an outwardly-extending, light support arm 52. Each light support arm 52 is generally L-shaped, and has a generally horizontal portion 52a and a downward extending vertical portion 52b. Still referring to FIG. 1, a laterally-extending arm 54 is attached to the free ends of downward-extending, vertical portion 52b of each light support arm 52. Laterally-extending arm 54 is attached to lamp support arm 52 by an articulating joint 56 that allows articulated movement of laterally-extended arm 54 relative to light support arm 52. Surgical lights 12 are attached to the free ends of laterally-extending arms 54. Surgical lights 12 are attached to laterally-extending arms 54 to allow articulated movement of surgical lights 12 relative to laterally-extending arms 54.

Hub section 30C includes an outwardly-extending, monitor support arm 62. Monitor support arm 62 is generally L-shaped and has an elongated, horizontal portion 62a and downward-extending, vertical portion 62b. An articulating joint 66 at the free end of vertical portion 62b of monitor support arm 62 connects monitor support arm 62 to a laterally-extending arm 64. The outward-most end of laterally-extending arm 64 includes an articulating joint 68. Monitors 14A, 14B, 14C are mounted side-by-side on a support frame 69 that attaches to articulating joint 68.

A connector harness 72 comprised of a plurality of cables and lines extends from a control unit 74 to surgical lights 12 and monitors 14A, 14B, 14C through hub assembly 30, support arms 52, 62 and laterally extending arms 54, 64. In the embodiment shown, connector harness 72 is comprised of two light connecting cables 76 and a monitor connecting cable 78, best seen in FIGS. 4 and 4A. Each of the foregoing cables may include a plurality of wires or fiber, as illustrated in the drawings. These wires or fiber that together form connector harness 72 may include, but are not limited to, control lines, communication lines, data lines, power lines, audio lines and video lines. The term "monitor cable" as used herein shall be used to describe cable 78 that connects monitors 14A, 14B, 14C to control unit 74. Monitor cable 78 may include a plurality of individual lines, including but not limited to, control lines, communication lines, data lines, power lines and video lines and may be comprised of electrical wire or fiber optic wires. The wires and/or fibers that form light connection cables 76 and monitor cable 78 are preferably enclosed or encased within an outer sheath or casing to bundle the respective wires and fiber into a single member. Encasing wires and fibers in this manner facilitates wiring of surgical lighting/monitor system 10 and management of the respective wires and fibers, as shall be described in greater detail below.

Figure 4:
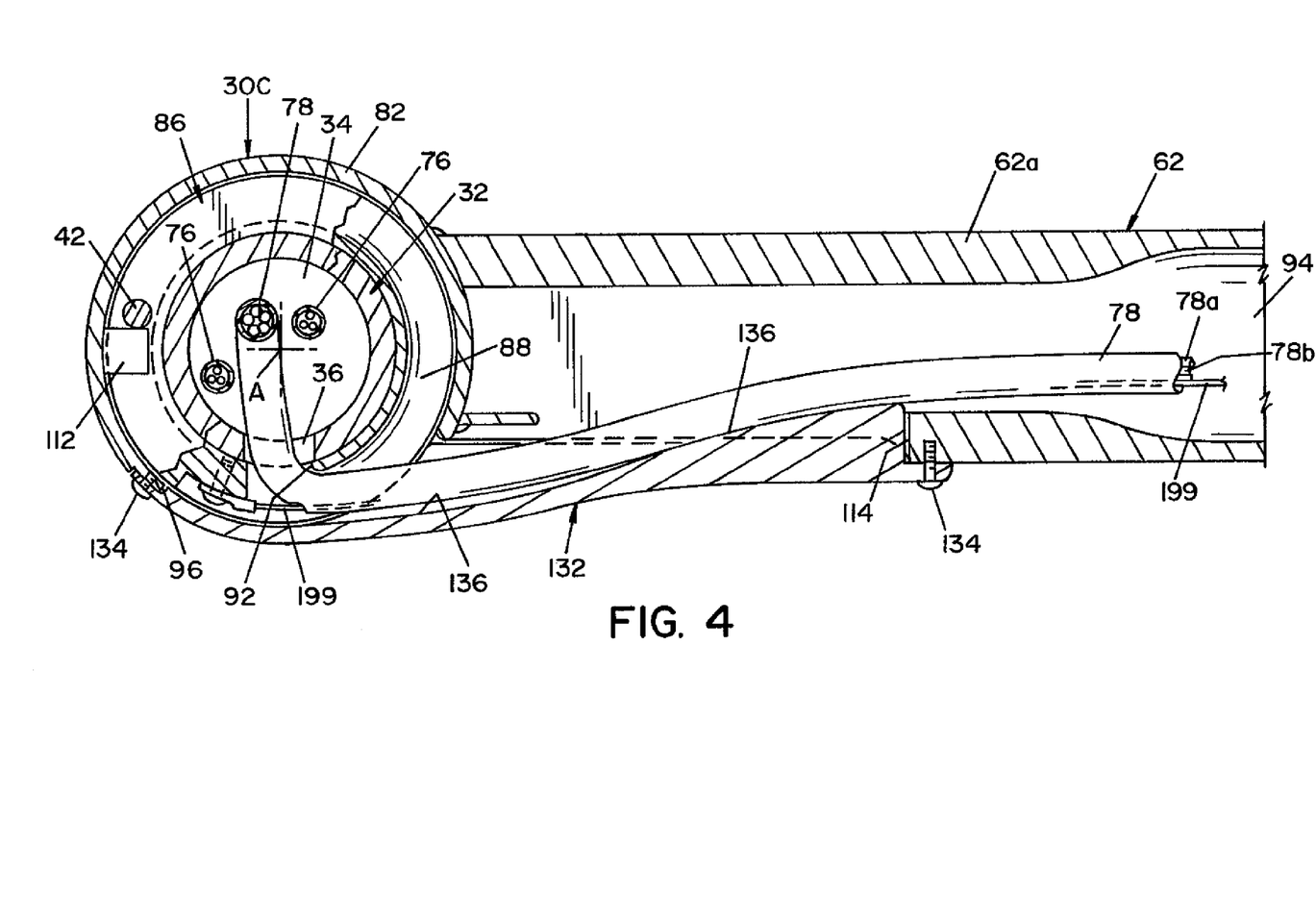
FIG. 4 is a sectional view taken along lines 4-4 of FIG. 2, showing a cable "take-up" spool showing a monitor cable harness mounted thereto.

Referring now to FIG. 2, a system for arranging and managing cable 78 that connects monitors 14A, 14B, 14C to control unit 74 shall be described. As best seen in FIG. 2, spindle 32 is generally a tubular member defining an internal cavity 34. As shown in FIG. 4, connector harness 72 is disposed within cavity 34 with individual cables 76, 78 of connector harness 72 being separated to communicate respectively with surgical lights 12 and monitors 14A, 14B, 14C. Monitor cable 78 separates from connector harness 72 to connect to monitors 14A, 14B, 14C through a support arm 62, as shall be described in greater detail below.

Figure 2A:
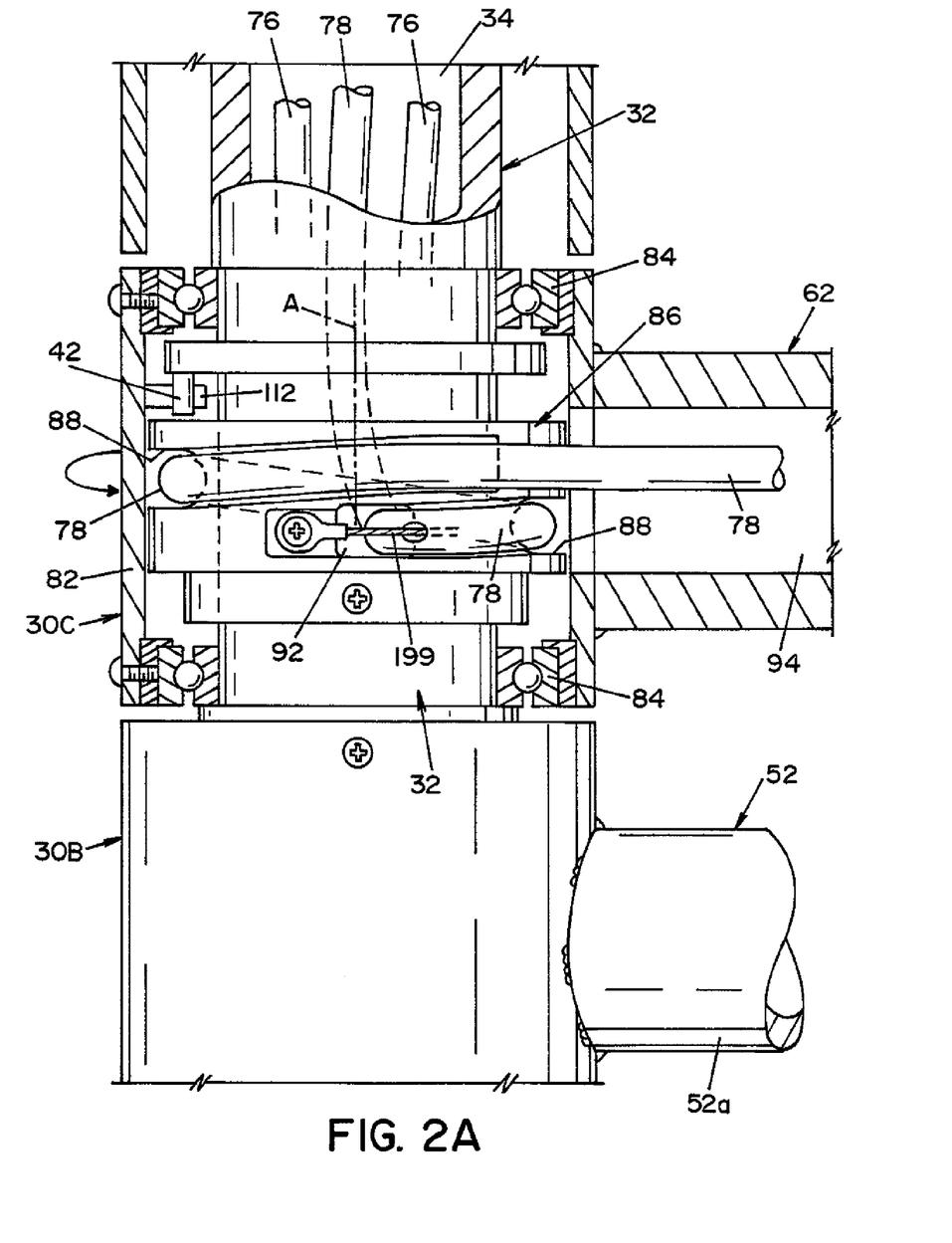
FIG. 2A is an enlarged, partially sectioned, elevational view showing a hub assembly from the surgical light/monitor system of FIG. 1, showing a spool and bearings disposed in the hub assembly.
Figure 6:
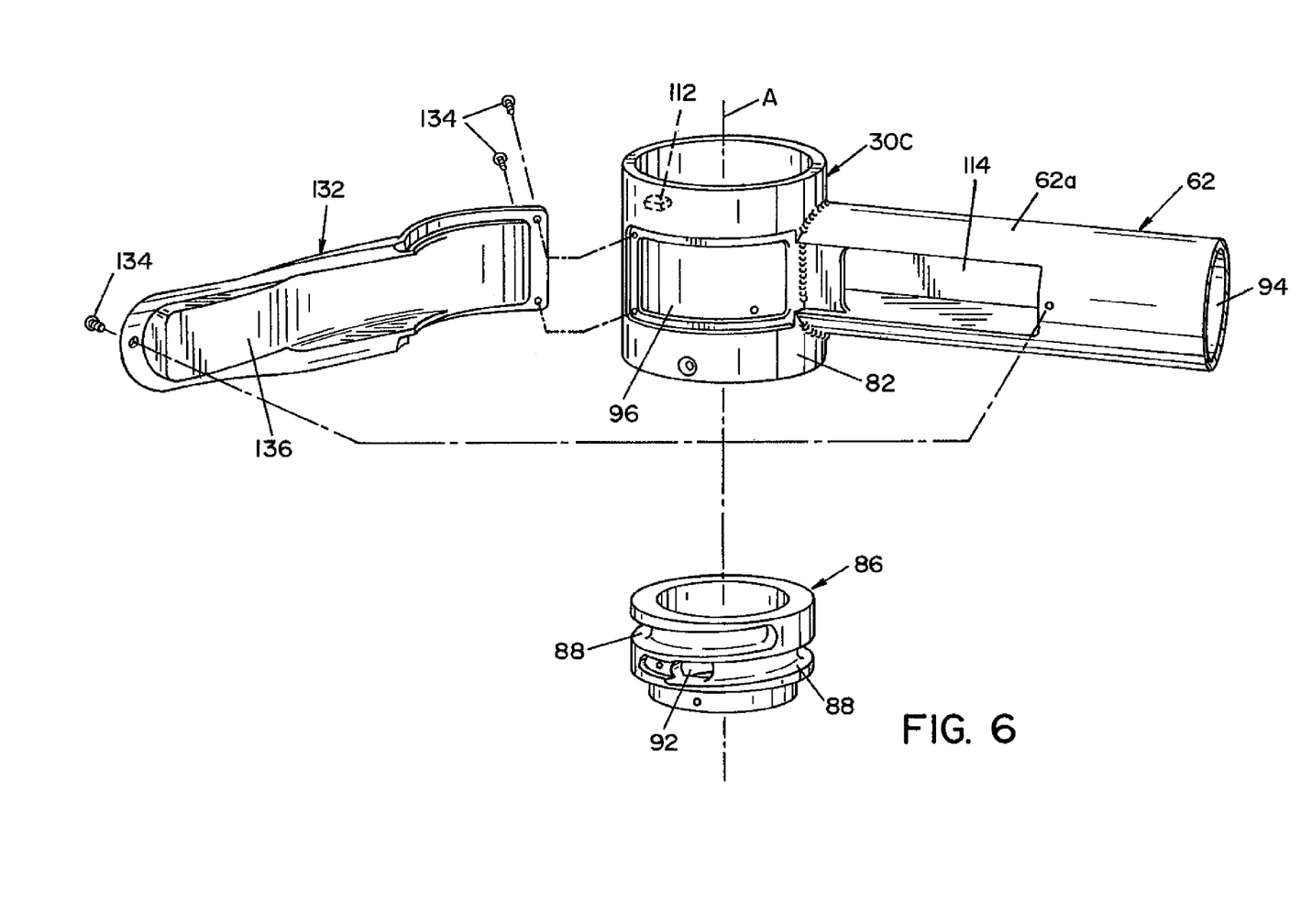
FIG. 6 is an exploded, perspective view showing a first cover plate relative to a first access port that is formed in the hub section and monitor support arm.

As best seen in FIG. 6, support arm 62 is attached to hub section 30C. Hub section 30C is comprised of a tubular sleeve 82 that is dimensioned to be mounted to spindle 32. Bearings 84 (best seen in FIGS. 2 and 2A) are disposed between sleeve 82 and spindle 32 to allow for free rotation of hub section 30C, and support arm 62 that is attached thereto, about spindle 32, and a vertical axis "A" (see FIG. 6) through spindle 32. As indicated above, spindle 32 is attached to mounting plate 22 and is maintained in a stationary position relative to mounting plate 22.

A cylindrical spool 86 is mounted to spindle 32. Spool 86 is disposed between spindle 32 and sleeve 82 of hub section 30C, and is mounted to spindle 32 to be stationary relative thereto. A spiral, i.e., helical groove 88 is formed in the outer surface of spool 86. An opening 36 (best seen in FIG. 4) is formed through the side wall of spindle 32. Opening 36 is disposed to be in registry with an opening 92 in spool 86, when spool 86 is mounted onto spindle 32. In the embodiment shown, opening 92 in spool 86 is disposed at one end, i.e., the lower end, of helical or spiral groove 88, as best seen in FIG. 6. In another embodiment (not shown), opening 92 is disposed at a location between the lower end and an upper end of helical, or spiral groove 88.

Figure 4A:
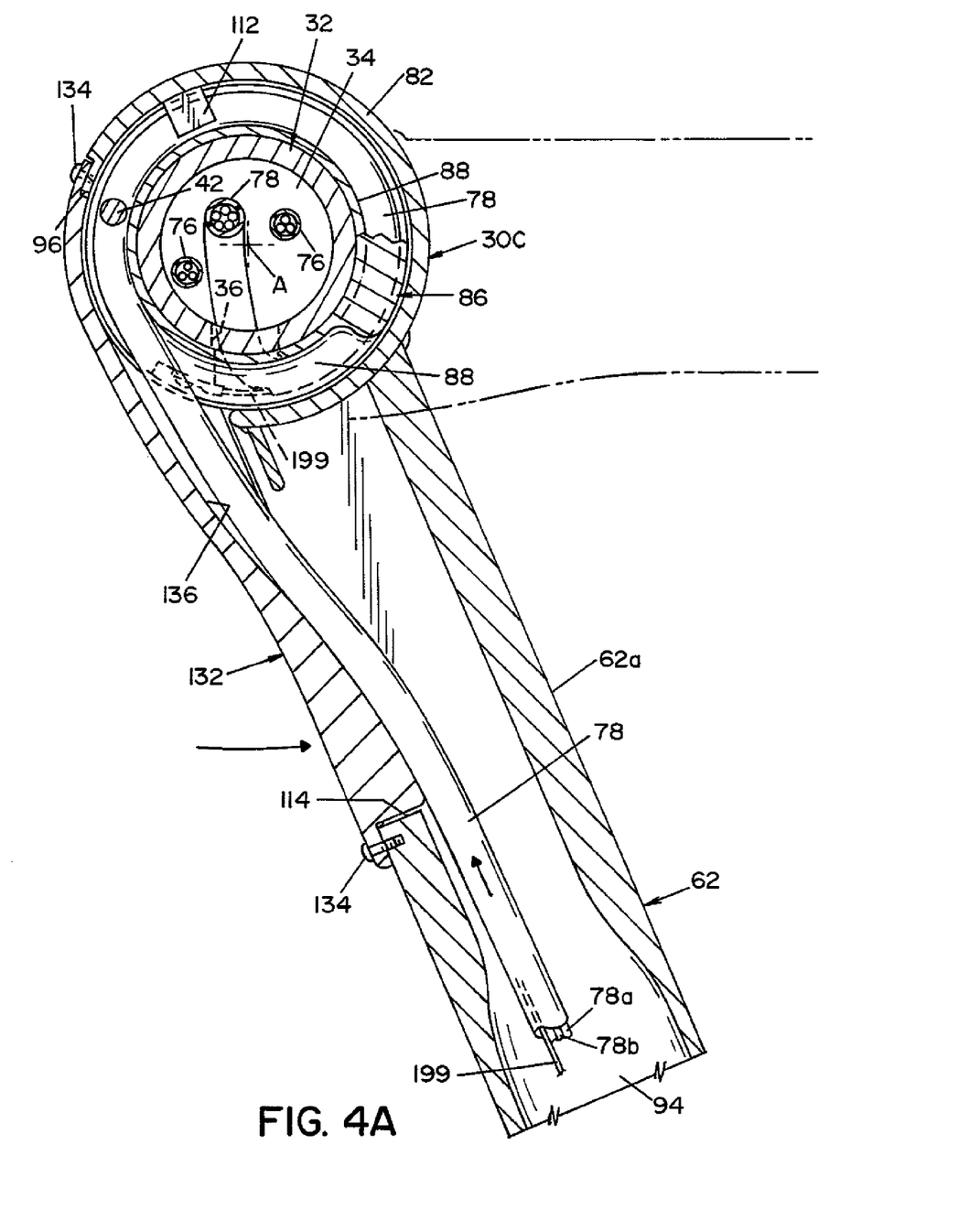
FIG. 4A is a sectional view showing the position of the monitor cable harness relative to the "take-up" spool when the support arm is rotated 270° relative to the position shown in FIG. 4.

Referring now to FIG. 6, in the embodiment shown monitor support arm 62 is basically a cylindrical tube that has been formed into an L-shape. A cylindrical passage or opening 94 is defined through monitor support arm 62. Sleeve 82 of hub section 30C and monitor support arm 62 are preferably formed of like metals. The free end of horizontal portion 62a of monitor support arm 62 is attached, by welding, brazing or the like, to the outer surface of sleeve 82. Monitor support arm 62 is attached to sleeve 82 such that the longest portion of monitor support arm 62, i.e., horizontal portion 62a, is generally perpendicular to the vertical axis "A" of spindle 32 of hub assembly 30. An opening 96 is formed in the side wall of sleeve 82 to communicate with spool 86 on spindle 32. A block 112 is attached to the inner surface of sleeve 82, as best seen in FIGS. 4 and 4A. Block 112 is disposed above spool 86.

An elongated slot or opening 114 is formed in monitor support arm 62 where horizontal portion 62a of monitor support arm 62 is joined to sleeve 82, as best seen in FIG. 6. Together, opening 96 in sleeve 82 and opening 114 in monitor support arm 62 define a first access opening. The first access opening generally exposes spool 86 on spindle 32 and passage 94 through monitor support arm 62.

A second access opening 122 (best seen in FIGS. 5 and 5A) is formed on the top side of monitor support arm 62. Second access opening 122 is spaced apart from the first access opening along the length of monitor support arm 62. In this respect, second access opening 122 is formed generally near the bend in monitor support arm 62. Second access opening 122 is of a predetermined size and shape to allow monitor cable 78 and attached components to be removed from monitor support arm 62 through second access opening 122, as shall be described in greater detail below.

A first cover plate 132 is provided to be mounted to hub section 30C and monitor support arm 62 to cover an enclosed first access opening. As best seen in FIGS. 4 and 4A, first cover plate 132 is dimensioned to be mounted to the outer cylindrical surface of sleeve 82 of hub section 30C and to mate with the cylindrical outer surface of monitor support arm 62. Conventional fasteners 134 extending through first cover plate 132 are used to mount first cover plate 132 to hub section 30C and monitor support arm 62. As best seen in FIGS. 4 and 4A, the inner surface of first cover plate 132 is formed to define a guide surface 136. Guide surface 136 forms a smooth contour converging with and conforming to the inner cylindrical surface of sleeve 82 of hub section 30C. Contoured guide surface 136 is provided to guide monitor cable 78, as shall be described in greater detail below.

Figure 3:
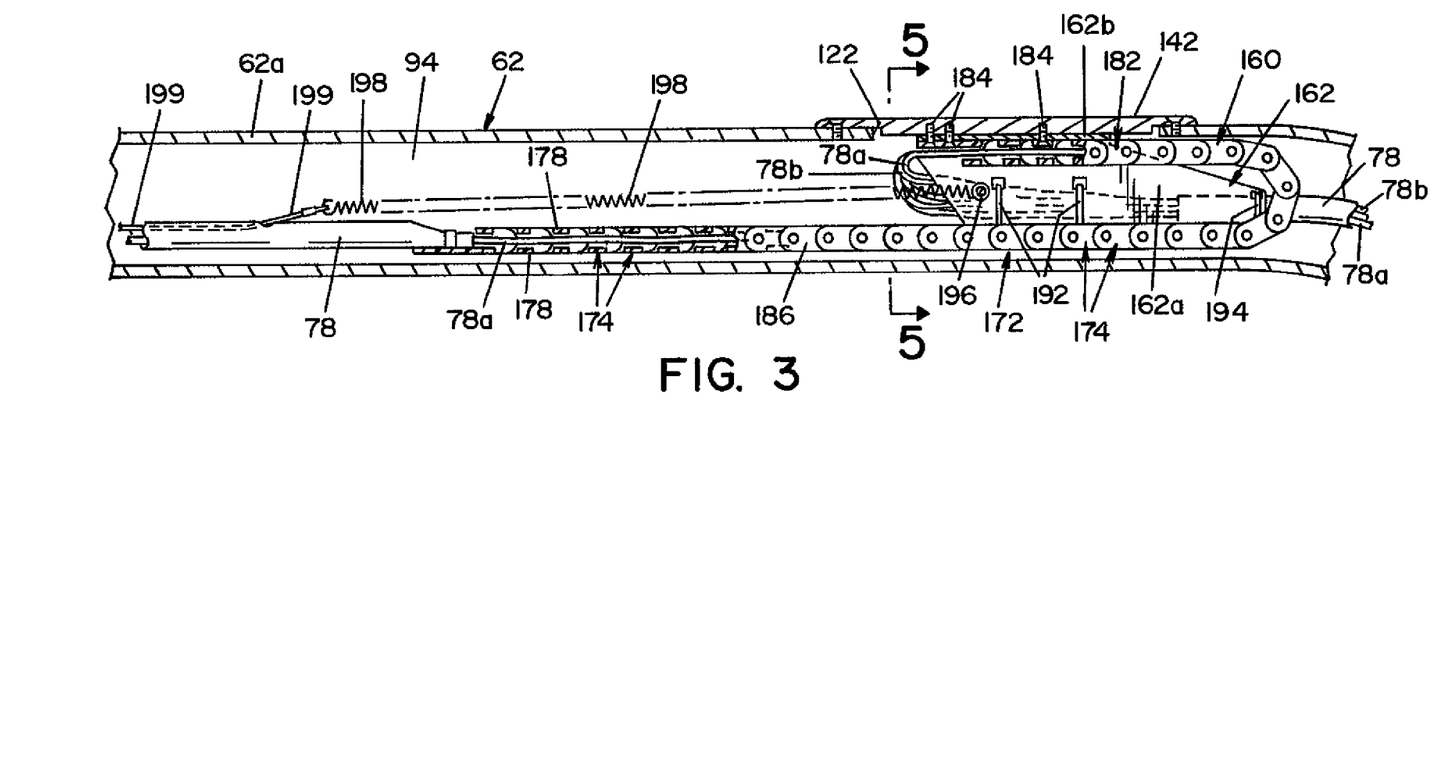
FIG. 3 is an enlarged, elevational view of a retractable harness assembly, illustrating a preferred embodiment of the present invention.
Figure 5:
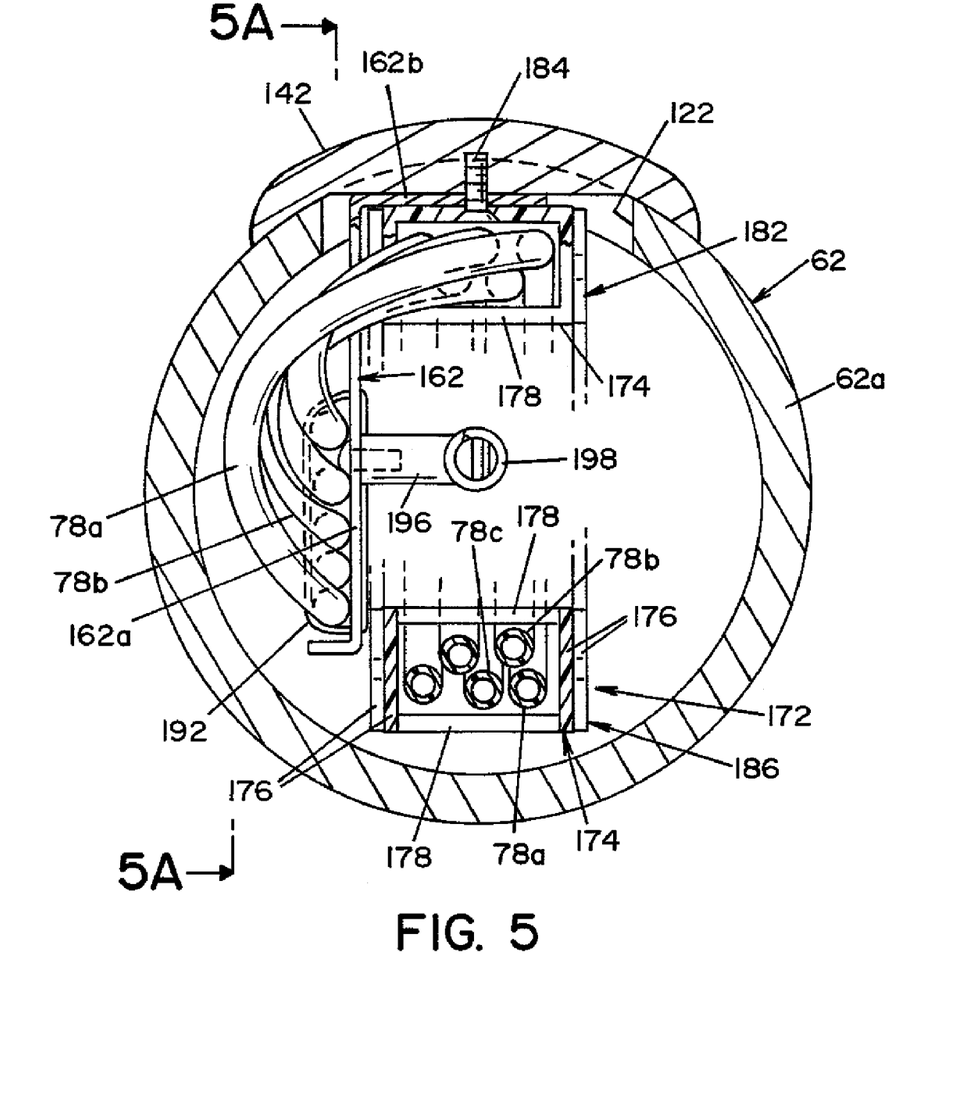
FIG. 5 is an enlarged, sectional view taken along lines 5-5 of FIG. 3.

Referring now to FIG. 3, a second cover plate 142 and a cable harness assembly 160 are best seen. Second cover plate 142 is generally obround in shape when viewed from above, and has a generally concave shape when viewed in cross-section, as best seen in FIG. 5. The inner surface of second cover plate 142 is dimensioned to conform to the outer surface of monitor support arm 62.

Figure 5A:
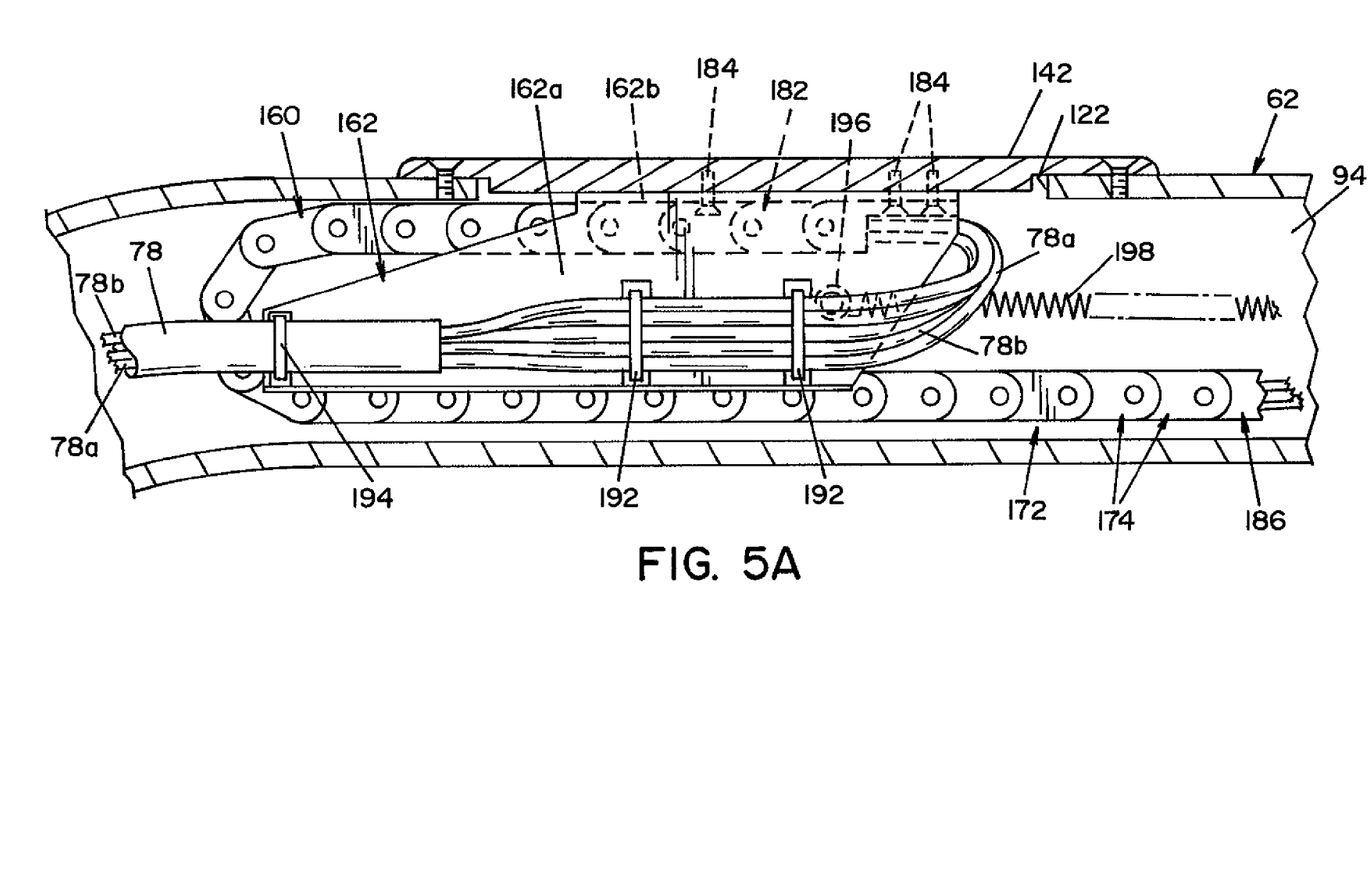
FIG. 5A is an enlarged, sectional view taken along lines 5A-5A of FIG. 5.

Cable harness assembly 160 includes a mounting bracket 162 that is dimensioned to be attached to the underside of second cover plate 142. Mounting bracket 162 has a trapezium-shaped side panel 162a and a laterally extending mounting flange 162b formed along one edge of side panel 162a. Flange 162b is dimensioned to be attached to the underside of second cover plate 142 such that the trapezium-shaped side panel 162a extends downward from the underside of second cover plate 142, as shown in FIGS. 5 and 5A. Mounting bracket 162 is designed such that when second cover plate 142 is attached to monitor support arm 62, cover plate 142 closes and covers second access opening 122 with side panel 162a of mounting bracket 162 disposed within passage 94 defined by monitor support arm 62.

Cable harness assembly 160 is dimensioned to be disposed within passage 94 defined by monitor support arm 62 to guide monitor cable 78 and to exert a tension force on cable 78 in a direction to bias cable 78 away from spindle 32. Cable harness assembly 160 includes a cable carrier 172. Cable carrier 172 is an elongated structure that is flexible in only a single plane. By way of example and not limitation, cable carrier 172 may take the form of an "e-chain cable carrier," Micro (Part No. 06-20-018-0) from Igus®. Cable carrier 172 is comprised of a plurality of like, interlocking links 174 that are connected to each other such that two adjacent links 174 are pivotable relative to each other along a generally horizontal axis. In the embodiment shown, each link 174 includes spaced-apart side walls 176 and a pair of connecting walls 178 that join side walls 176 together. The side walls 176 have pins at one end of each link and have holes at the other end of the link. The pins and holes are used to join links together in a conventionally known fashion to form cable carrier 172. As will be appreciated, cable carrier 172 is exemplary, and is not intended to limit the scope of the present invention. In this regard, other cable carriers may find advantageous use in connection with the present invention.

As best seen in FIG. 3, cable carrier 172 is an elongated structure. One end of the cable carrier i.e., a first end, is attached to the underside of second cover plate 142. The portion of cable carrier 172 attached to the underside of second cover plate 142 defines an upper run or leg i.e., a first run, 182 that extends away from hub section 30C and towards the bend in monitor support arm 62. As best seen in FIGS. 3 and 5, upper run 182 of cable carrier 172 is attached to second cover plate 142 at several locations by conventional fasteners 184 extending through connecting walls 178 of cable carrier 172 and through flange 162b on mounting bracket 162. Cable carrier 172 then turns downward beneath itself i.e., replicates on itself, and defines a lower run i.e., a second run, 186 that extends toward hub section 30C.

Cable carrier 172 is provided to position and guide monitor cables 78 extending through monitor support arm 62. In the embodiment shown, monitor cable 78 from control unit 74 extends down through cavity 34 of spindle 32, through opening 36 in the wall of spindle 32 and through opening 92 in the wall of spool 86. In this position, monitor cable 78 communicates with one end, i.e., the lower end, of helical or spiral groove 88. From spool 86, monitor cable 78 extends along guide surface 136 of first cover plate 132 into support arm 62. Monitor cable 78 is disposed within a channel or passageway defined by cable carrier 172. As indicated above, monitor cable 78 is comprised of a plurality of individual wires or cables, designated 78a, 78b, 78c, etc. (see FIG. 5), that are bundled together within an outer sheath or wrapping to form monitor cable 78. In the embodiment shown, the outer sheath or wrapping of monitor cable 78 is removed in the vicinity of cable carrier 172 such that individual wires 78a, 78b, 78c, etc., may extend through the channel defined by cable carrier 172. In this respect, individual wires 78a, 78b, 78c, etc., when loose, more easily bend around the turn or curve formed in cable carrier 172 between upper run 182 and lower run 186.

As best seen in FIG. 5, cable carrier 172 is disposed to one side of side panel 162a of mounting bracket 162. As illustrated in FIG. 5, individual wires 78a, 78b, 78c, etc., of monitor cable 78 are confined within the channel defined by side walls 176 and connecting walls 178 of cable carrier 172. As shown in FIG. 3, the end of cable carrier 172 along upper run 182 generally coincides with the end of side panel 162a of mounting bracket 162. Wires 78a, 78b, 78c, etc., of monitor cable 78 then wrap around to the side of side panel 162a opposite to cable carrier 172, as shown in FIG. 5. In other words, wires 78a, 78b, 78c, etc., of monitor cable 78 are separated from cable carrier 172 by side panel 162a of mounting bracket 162, as best seen in FIG. 5. Apertures are formed through side panel 162a of mounting bracket 162 to receive cable ties 192 (see FIG. 3) that tie and adhere mounting cable 78 and wires 78a, 78b, 78c, etc., to mounting bracket 162. The sheathing on monitor cable 78 that extends beyond mounting bracket 162 preferably remains on monitor cable 78 such that monitor cable 78 can be attached to the end of mounting bracket 162 by a cable tie 194, as shown in FIG. 3.

As best seen in FIG. 5, mounting post 196 is attached to mounting bracket 162 to extend between upper run 182 and lower run 186 of cable carrier 172. One end of a tension spring 198 is attached to mounting post 196. The other end of tension spring 198 is attached to one end of a cable connector 199 that is secured to monitor cable 78 (see FIG. 3). In the embodiment shown, cable connector 199 is an elongated length of a wire. The intermediate portion of cable connector 199 is securely attached to an axial portion of monitor cable 78 such that cable connector 199 and monitor cable 78 move in unison. In other words, the intermediate portion of cable connector 199 is attached to monitor cable 78 such that cable connector 199 moves with monitor cable 78. Tension spring 198 is attached to one end of connector 199. The distal end of cable connector 199 that extends from monitor cable 78 is attached to spool 86 on spindle 32, as best seen in FIG. 4. Tension spring 198 acts as a biasing and tensioning element to maintain tension on monitor cable 78 and cable carrier 172 and to bias monitor cable 78 and cable carrier 172 away from spool 86 and away from hub section 30C.

Referring now to the operation of the cable harness assembly 160, FIG. 4 shows a sectional view of monitor support arm 62 and hub section 30C, as viewed from above. Monitor support arm 62 is in a first position wherein monitor support arm 62 is at its extreme position in a clockwise direction of rotation (when viewed from above). In this respect, inwardly projecting block 112 mounted along the inner surface of sleeve 82 of hub section 30C engages a stop, designated 42, that is fixed relative to spindle 32 to limit rotation of monitor support arm 62 in a clockwise direction. As indicated above, spindle 32 and spool 86 are fixedly attached to mounting plate 22 and are stationary. Accordingly, further rotation of sleeve 82 of hub section 30C (and monitor support arm 62) in a clockwise direction is thus prevented by the engagement of block 112 against stop 42. In this position, tension spring 198 is retracted and essentially none of monitor cable 78 is wound around spool 86. As monitor support arm 62 is moved in a counter-clockwise direction (when viewed from above), monitor cable 78 remains stationary relative to spindle 32 and spool 86 as sleeve 82 of hub section 30C rotates around spindle 32. Because cable connector 199 is attached to spool 86 and to monitor cable 78, movement of support arm 62 in a counter-clockwise direction about spindle 32 causes monitor cable 78 to be forced into helical groove 88 of spool 86 and to be wound around spool 86 and spindle 32 as support arm 62 rotates in a counter-clockwise direction. As monitor cable 78 is wrapped around spool 86, the end of lower run 186 of cable carrier 172 is drawn toward spindle 32 as lower run 186 of cable carrier 172 replicates and moves beneath upper run 182 of cable carrier 172. As cable carrier 172 moves toward spindle 32, lower run 186 of cable carrier 172 lengthens and upper run 182 shortens as cable carrier 172 replicates under itself. At the same time, tension spring 198 expands.

FIG. 4A illustrates how monitor cable 78 wraps around spool 86 as monitor arm 62 rotates in a counter-clockwise direction from the position in FIG. 4 that is shown in phantom in FIG. 4A.

If monitor support arm 62 is then moved in a clockwise direction from the position shown in FIG. 4A, the tension in tension spring 198 will pull monitor cable 78 away from spool 86. As monitor cable 78 is withdrawn from spool 86, lower run 186 of cable carrier 172 moves away from spool 86, and upper run 182 of cable carrier 172 lengthens as the links move from lower run 186 to upper run 182. As illustrated in FIGS. 4 and 4A, the inner surface profile of first cover plate 132 provides a smooth guide surface for guiding monitor cable 78 into and from groove 88 of spool 86.

The present invention thus provides a cable management system that allows direct connection between a monitor 14 on a movable support arm 62 and an external control unit 74. Cable carrier 172 within monitor support arm 62 allows for repeated, controlled movement of monitor support arm 62, and in turn, of monitor cable 78, without kinking or binding of monitor cable 78. The present invention further provides a system suitable for any type of connector line for connecting a monitor to a remote control unit. In this respect, the cable management system as set forth above finds advantageous application with conventional copper electrical wires or with fiber optic wires.

Still further, a cable management system according to the present invention enables easy replacement of a monitor cable 78 without disassembly of hub assembly 30. To replace a monitor cable 78, the individual wires and connector lines of monitor cable 78 are disconnected from monitor(s) 14A, 14B, 14C. Monitor cable 78 is also disconnected from control unit 74 and separated from connector harness 72. Removal of first cover plate 132 allows access to spool 86 and to the fastener attaching cable connector 199 to spool 86. Removal of the fastener releases cable connector 199 and monitor cable 78 from spool 86.

With the distal ends of monitor cable 78 disconnected from monitor(s) 14A, 14B, 14C and control unit 74, and with cable connector 199 (and thus monitor cable 78) disconnected from spool 86, removal of second cover plate 142 allows removal of the entire monitor cable 78 and cable harness assembly 160 from surgical light/monitor system 10. Because mounting bracket 162 and cable carrier 172 are attached to second cover plate 142, removal of second cover plate 142 allows the entire monitor cable 78 (including cable carrier 172) to be withdrawn from monitor support arm 62 through second access opening 122. In this respect, second access opening 122 is dimensioned to allow cable carrier 172 and monitor cable 78 to be drawn therethrough.

Attaching an "auxiliary guide cable" to each end of monitor cable 78 as monitor cable 78 is being withdrawn from surgical light/monitor system 10, allows the "guide cables" to be drawn through hub assembly 30 and support arm 62. These guide cables can then be used to draw a new, replacement monitor cable 78 into system 10. In this respect, these "guide cables" may then be attached to the ends of a new monitor cable 78 and be used to draw new monitor cable 78 (with cable carrier 172 attached) into support arm 62 and through hub assembly 30 to control unit 74 and through support arm 62 to monitor(s) 14A, 14B, 14C.

Thus, in addition to providing cable management within a support arm, the present invention provides an arrangement that enables quick replacement of a cable and retractable harness assembly.

Figure 7:
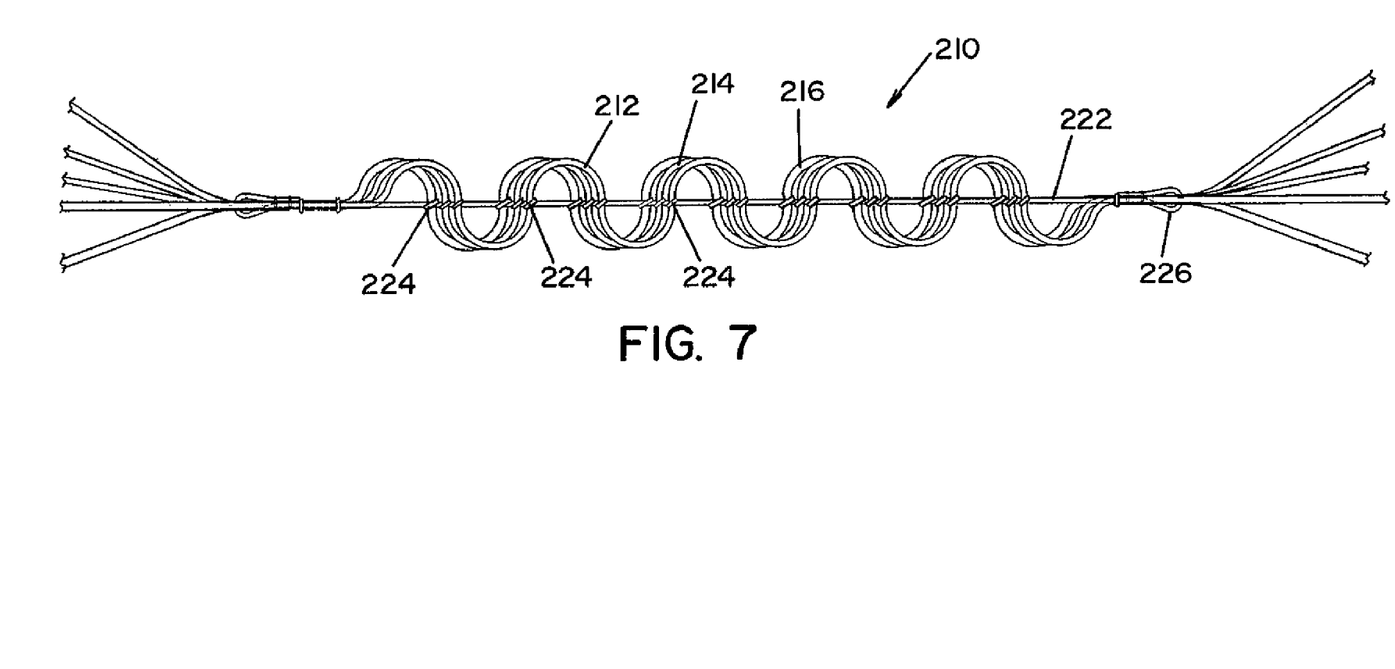
FIG. 7 is a perspective view illustrating a cable management system according to an alternate embodiment of the present invention.

Referring now to FIG. 7, a cable management system 210 illustrating an alternate embodiment of the present invention is shown. In the system shown in FIG. 7, one or more connection cables or wires 212, 214, 216, etc., that are used to attach a control unit 74 to monitor(s) 14A, 14B, 14C, are attached to a shock cord (bungee cord) i.e., an expandable element, 222 at spaced-apart intervals. When bungee cord 222 is in a relaxed, unstretched condition i.e., a contracted state, monitor connection cable(s) 212, 214, 216 assume(s) a sine-wave configuration as shown in FIG. 7. The spacing between attachment points 224 on bungee cord 222 is such that the distance between the peaks and valleys of connection wires 212, 214, 216, etc., is less than the diameter of opening 94 through monitor support arm 62. This prevents connection wires 212, 214, 216, etc., from being restricted or binding against the inner surface of support arm 62 when bungee cord 222 is in its neutral, non-extended position.

One end of bungee cord 222 includes means for attaching bungee cord 222 to the underside of second cover plate 142. In the embodiment shown, the attachment means comprises a loop 226 on bungee cord 222. Loop 226 may be attached to a hook (not shown) extending from the underside of second cover plate 142. Cord 222 extends through support arm 62 toward spool 86 on spindle 32. Connection wires 212, 214, 216, etc., are preferably bundled within a sheath or casing in the vicinity of spool 86 so as to be able to be wound together onto spool 86 in helical groove 88, as described above.

As will be appreciated, cord 222 acts as a tensioning device to maintain tension on connection cable or wires 212, 214, 216, etc., extending from spool 86. In this respect, as connection cables 212, 214, 216, etc., are wound onto spool 86 as support arm 62 rotates thereabout, cord 222 expands, providing more of connection cables 212, 214, 216 to be wound onto spool 86. The expansion of cord 222 into an expanded state maintains tension on connection cables 212, 214, 216, etc. When monitor support arm 62 moves in the opposite direction, cord 222 contracts to "take up," i.e., retract, connection cables 212, 214, 216, etc., as such cables are unwound from spool 86.

The harness assembly shown in FIG. 7 thus provides a cable traction system for managing and controlling the connection cables extending through a support arm that is rotatable about a central hub.

Figure 8:
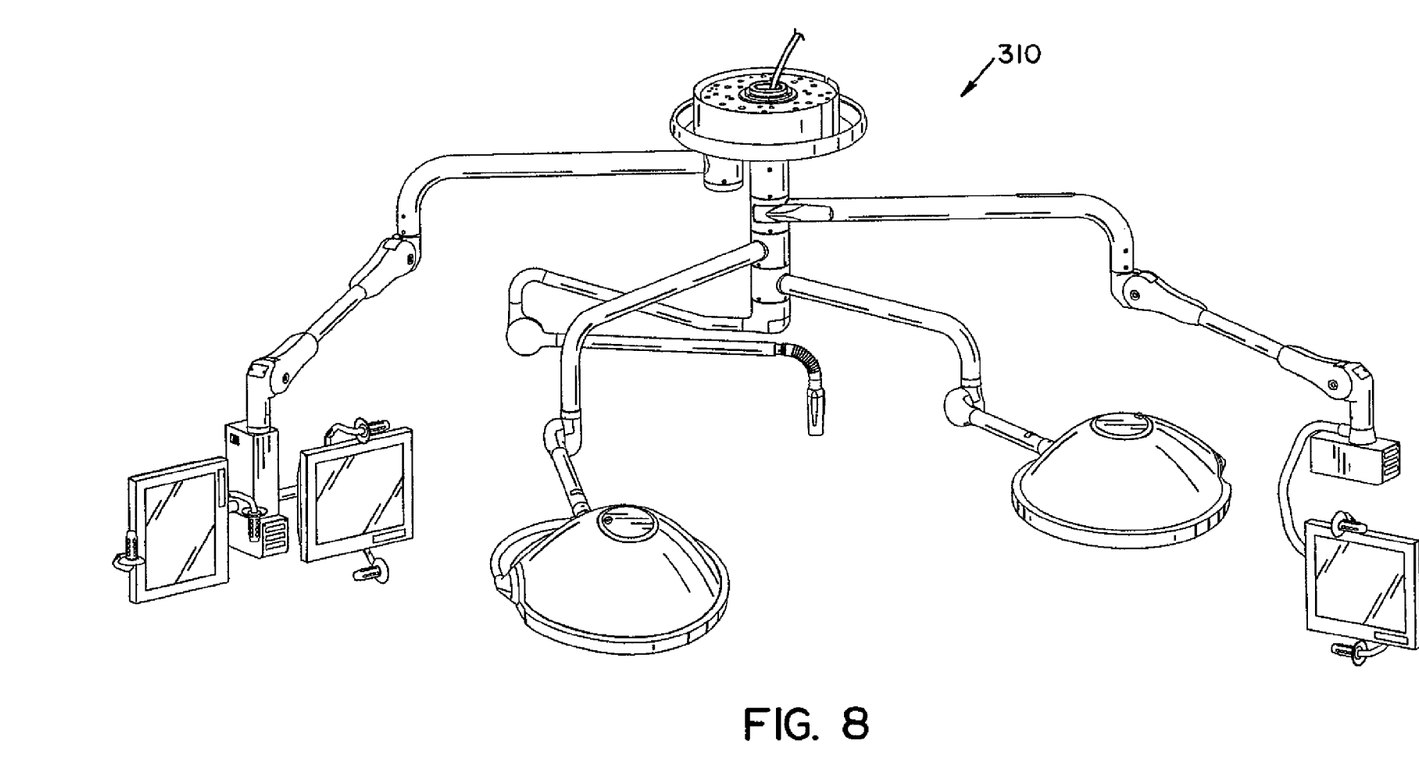
FIG. 8 is a perspective view of a ceiling-mounted surgical light/monitor system, illustrating an alternate embodiment of the present invention.

FIG. 8 shows a surgical lighting/monitor system 310, illustrating an alternate embodiment of the present invention.

The foregoing description is a specific embodiment of the present invention. It should be appreciated that this embodiment is described for purposes of illustration only, and that numerous alterations and modifications may be practiced by those skilled in the art without departing from the spirit and scope of the invention. In this respect, while the cable management system has been described with respect to a monitor cable, it will be appreciated that such system is not limited to use with a monitor cable, but will also find advantageous application with any cable within any support arm of the surgical light monitor system and likewise is applicable to other cable management applications. Still further, as indi- Having described the invention, the following is claimed:

1. In a surgical light/monitor system for use in a surgical theater, said light/monitor system having a central hub and at least one tubular support arm rotatable about said central hub, a cable management system for managing at least one cable extending through said support arm and through said hub, said cable management system comprised of:
   a spool disposed in a hub, said spool having an opening extending through a wall of said spool; and
   a cable carrier disposed within said support arm, said cable carrier dimensioned to contain at least one cable extending through said support arm, said cable carrier having a first end fixed relative to said support arm and a second end extending towards said hub, said cable carrier disposed in said support arm such that said cable carrier replicates upon itself to define a first run and a second run,
   said second end of said cable carrier being movable relative to said hub when said support arm rotates about said hub, wherein said first run shortens and said second run lengthens when said support arm rotates in a direction about said hub.

2. In a surgical light/monitor system as defined in claim 1, further comprising:
   a helical groove formed in an outer surface of said spool and said opening through said spool communicating with said helical groove.

3. In a surgical light/monitor system as defined in claim 1, wherein said cable management system is further comprised of:
   a tension element having a first end connected to said support arm a second end connectable to said cable carrier wherein said tension element exerts a force on said cable carrier biasing said cable carrier away from said spool.

4. In a surgical light/monitor system as defined in claim 1, further comprising:
   a first access opening formed partially in said hub and partially in said support arm, said first access opening disposed on said hub and said support arm such that said spool is exposed; and
   a first cover plate releasably mountable to said hub and said support arm to cover said first access opening.

5. In a surgical light/monitor system as defined in claim 4, further comprising:
   a second access opening formed in said support arm, said second access opening disposed on said support arm such that said cable carrier is exposed; and
   a second cover plate releasably mountable to said support arm to cover said second access opening.

6. In a surgical light/monitor system as defined in claim 5, wherein said first end of said cable carrier is connected to said second cover plate.

7. In a surgical light/monitor system as defined in claim 1, wherein said cable carrier is flexible only in a single plane.

8. In a surgical light/monitor system as defined in claim 1, wherein said hub is mounted to a ceiling.

9. In a surgical light/monitor system as defined in claim 1, wherein said second end of said cable carrier moves with said cable when said support arm rotates around said hub.

10. In a surgical light/monitor system as defined in claim 9, wherein said second end of said cable carrier is connected to said cable.

11. A cable management system for managing at least one cable extending through a support arm and through a hub, said support arm being rotatable about said hub, said cable management system comprised of:
   a spool disposed in a hub, said spool having an opening extending through a wall of said spool; and
   a cable carrier disposed within said support arm, said cable carrier dimensioned to contain at least one cable extending through said support arm, said cable carrier having a first end fixed relative to said support arm and a second end extending towards said hub, said cable carrier disposed in said support arm such that said cable carrier replicates upon itself to define a first run and a second run,
   said second end of said cable carrier being movable relative to said hub when said support arm rotates about said hub, wherein said first run shortens and said second run lengthens when said support arm rotates in a direction about said hub.

12. A cable management system as defined in claim 11, further comprising:
   a helical groove formed in an outer surface of said spool, said opening through said spool communicating with said helical groove.

13. A cable management system as defined in claim 11, wherein said cable management system is further comprised of:
   a tension element having a first end connected to said support arm and a second end connectable to said cable carrier wherein said tension element exerts a force on said cable carrier biasing said cable carrier away from said spool.

14. In a surgical light/monitor system for use in a surgical theater, said light/monitor system having a hub and at least one tubular support arm rotatable about said hub, a cable management system for managing at least one cable extending through said support arm and through said hub, said cable management system comprised of:
   a spool disposed in a hub, said spool having an opening extending through a wall of said spool; and
   an expandable element disposed within said support arm, said expandable element dimensioned to connect at discrete points to at least one cable extending through said support arm, said expandable element having a first end fixed relative to said support arm and a second end extending towards said hub, said expandable element having a contracted state and an expanded state wherein said contracted state is shorter than said expanded state,
   said second end of said expandable element being movable relative to said hub when said support arm rotates about said hub, wherein said expandable element extends from said contracted state to said expanded state when said support arm rotates in a direction about said hub.

15. In a surgical light/monitor system as defined in claim 14, further comprising:
   a helical groove formed in an outer surface of said spool and said opening through said spool communicating with said helical groove.

16. In a surgical light/monitor system as defined in claim 14, further comprising:
   a first access opening formed partially in said hub and partially in said support arm, said first access opening disposed on said hub and said support arm such that said spool is exposed; and a first cover plate releasably mountable to said hub and said support arm to cover said first access opening.

17. In a surgical light/monitor system as defined in claim 16, further comprising:
 a second access opening formed in said support arm, said second access opening disposed on said support arm such that said cable carrier is exposed; and
 a second cover plate releasably mountable to said support arm to cover said second access opening.

18. In a surgical light/monitor system as defined in claim 17, wherein said first end of said expandable element is connected to said second cover plate.

19. In a surgical light/monitor system as defined in claim 14, wherein said hub is mounted to a ceiling.

20. In a surgical light/monitor system as defined in claim 14, wherein said expandable element is connected to said cable at said discrete points such that said cable forms a wave pattern.

21. In a surgical light/monitor system as defined in claim 20, wherein said wave pattern is a uniform sine-wave configuration.

22. A cable management system for managing a cable in a support arm, said support arm being rotatable about a hub, said cable management system comprised of:
 a spool disposed in a hub, said spool having an opening extending through a wall of said spool; and
 an expandable element disposed within said support arm, said expandable element dimensioned to connect at discrete points to at least one cable extending through said support arm, said expandable element having a first end fixed relative to said support arm and a second end extending towards said hub, said expandable element having a contracted state and an expanded state wherein said contracted state is shorter than said expanded state, said second end of said expandable element being movable relative to said hub when said support arm rotates about said hub, wherein said expandable element extends from said contracted state to said expanded state when said support arm rotates in a direction about said hub.

23. A cable management system as defined in claim 22, further comprising:
 a helical groove formed in an outer surface of said spool and said opening through said spool communicating with said helical groove.

24. A cable management system as defined in claim 22, wherein said expandable element is connected to said cable at said discrete points such that said cable forms a wave pattern.

25. A cable management system as defined in claim 24, wherein said wave pattern is a uniform sine-wave configuration.

* * * * *